(12) United States Patent
Goldberg et al.

(10) Patent No.: US 9,906,535 B2
(45) Date of Patent: Feb. 27, 2018

(54) METHODS FOR RAPID ENROLLMENT OF USERS OF A SECURE, SHARED COMPUTER SYSTEM VIA SOCIAL NETWORKING AMONG PEOPLE ON A SELECTIVE LIST

(71) Applicants: Arthur P. Goldberg, Bronx, NY (US); Matthew A. Rosen, New York, NY (US)

(72) Inventors: Arthur P. Goldberg, Bronx, NY (US); Matthew A. Rosen, New York, NY (US)

( * ) Notice: Subject to any disclaimer, the term of this patent is extended or adjusted under 35 U.S.C. 154(b) by 716 days.

(21) Appl. No.: 14/480,488

(22) Filed: Sep. 8, 2014

(65) Prior Publication Data

US 2015/0074771 A1 Mar. 12, 2015

Related U.S. Application Data

(60) Provisional application No. 61/876,030, filed on Sep. 10, 2013.

(51) Int. Cl.
*H04L 29/06* (2006.01)
(52) U.S. Cl.
CPC .......... *H04L 63/101* (2013.01); *H04L 63/104* (2013.01)
(58) Field of Classification Search
CPC ............................ H04L 63/101; H04L 63/104
See application file for complete search history.

(56) References Cited

U.S. PATENT DOCUMENTS 5,263,158 A 11/1993 Janis
5,263,165 A 11/1993 Janis
(Continued)

*Primary Examiner* — Joseph P Hirl
*Assistant Examiner* — Thomas Gyorfi
(74) *Attorney, Agent, or Firm* — Ditthavong & Steiner, P.C.

(57) ABSTRACT

The present invention is directed to a system for rapid enrollment of users of a secure, shared computer system comprising: (a) a secure shared computer system accessible only by approved users; (b) a plurality of approved users of the secure shared computer system; (c) a system manager that operates the secure shared computer system; (d) a plurality of member organizations, wherein the member organizations purchase a right to allow employees or members of the member organizations to be approved users of the shared computer system from the system manager; (e) at least one email system operated by each member organization which the employees or members of the member organizations use to receive and send email, where access to email sent to each individual employee or member is securely limited to that individual; (f) at least one accrediting organization, wherein the at least one accrediting organization registers member organizations and grants rights for employees or members of the member organizations, individuals holding such rights being people who are eligible to use the shared computer system; and (g) a selective list of eligible organizations and individuals; wherein an organization must be registered by the accrediting organization to be eligible to be a member organization; wherein a person must be an employee or member of a member organization and hold rights granted by at least one of the accrediting organizations to be eligible to be a user of the shared computer system; wherein the system manager organizes the shared computer system to enforce registration by an organization and holding of rights by an individual; and wherein the selective list enumerates the individuals who hold such rights and are eligible to become approved users of the shared computer system.

20 Claims, 9 Drawing Sheets

(56) References Cited

U.S. PATENT DOCUMENTS

| | | |
|---|---|---|
| 6,658,400 B2 | 12/2003 | Perell et al. |
| 7,877,611 B2 | 1/2011 | Camacho et al. |
| 8,145,915 B2 | 3/2012 | Milgramm |
| 8,151,332 B2 | 4/2012 | Cross et al. |
| 8,825,574 B2 | 9/2014 | Bodor et al. |
| 2009/0106434 A1 | 4/2009 | Zirbel et al. |
| 2012/0139703 A1 | 6/2012 | Szoke et al. |
| 2013/0346310 A1* | 12/2013 | Burger .................... G06F 21/00 705/44 |
| 2014/0075565 A1* | 3/2014 | Srinivasan ....... G06Q 10/06315 726/26 |
| 2014/0280931 A1* | 9/2014 | Braun .................... H04L 63/10 709/225 |

\* cited by examiner

METHODS FOR RAPID ENROLLMENT OF USERS OF A SECURE, SHARED COMPUTER SYSTEM VIA SOCIAL NETWORKING AMONG PEOPLE ON A SELECTIVE LIST

CROSS-REFERENCES TO RELATED APPLICATIONS

This application claims the benefit of U.S. Provisional Patent Application No. 61/876,030, entitled "Methods for Rapid Enrollment of Users of a Secure, Shared Computer System Via Social Networking Among People on a Selective List, by Arthur P. Goldberg and Matthew A. Rosen, filed Sep. 10, 2013, the contents of which are hereby incorporated by reference herein in their entirety.

FIELD OF THE INVENTION

This invention relates generally to methods for increasing the number of users of shared computer systems while retaining security. More specifically, this invention describes methods for rapid enrollment of users through social networking among people on a selective list.

BACKGROUND OF THE INVENTION

In many cases, a user population uses a shared computer system. However, there is a critical problem that frequently occurs in the early stages of the growth of the user population in a shared computer system that can only be accessed by authorized users who use the system to securely share information. Suppose that the number of users of the shared computer system is much smaller than the number of people on a selective list of eligible users and that a user may want to communicate with any other person on the selective list. Very frequently a user who wishes to collaborate with a person on the selective list will find that the person is not a user, and therefore cannot be sent information that would be securely shared on the shared computer system. This inability to communicate with a desired recipient severely limits the utility of the shared computer system. This is called the incomplete network problem, because while only a small fraction of the people on the selective list are users of the shared computer system, those users cannot use the shared computer system to connect with the majority of people on the selective list.

The incomplete network problem is further complicated by the need to maintain the shared computer system's security. A secure system ensures that only authorized users can access the system and the information that it stores, and that malicious parties cannot disrupt this access. On numerous recent occasions supposedly secure systems have been breached. Systems have been inappropriately accessed and sensitive data, such as financial and medical information, has been acquired by unauthorized people in many ways. These means have included hacking, insider defections, malicious software such as viruses, accidental data releases, and others. In addition, malicious parties have attacked and overwhelmed supposedly secure systems, such as the systems of some banks, thereby denying access to authorized users. These frequent and high-profile security violations, affecting a significant number of organizations, has given rise to increasing concern about computer and data security.

Therefore, there is a need to solve the incomplete network problem while maintaining all of the security properties of the shared computer system.

SUMMARY OF THE INVENTION

The invention described herein provides a process whereby a secure shared computer system can rapidly identify and enroll new users while securely restricting access to only authorized users.

This invention solves the incomplete network problem while securely restricting access to only authorized users.

This invention includes methods for assisting persons with access to a shared computer system in collaborating with other people who are eligible to use the shared computer system, in terms of meeting specified criteria set forth by the operator of the shared computer system, but have not yet been granted specific access rights. In addition, the invention comprises methods for assisting people who wish to gain access to a shared computer system, including eligibility verification.

These and other features of the present invention will be described in more detail below in the Detailed Description of the Invention and in conjunction with the following figures.

In general, a system according to the present invention comprises a system for rapid enrollment of people as users of a secure, shared computer system comprising:

(a) a secure shared computer system accessible only by approved users;

(b) a plurality of approved users of the secure shared computer system;

(c) a system manager that operates the secure shared computer system;

(d) a plurality of member organizations, wherein the member organizations purchase a right to allow employees or members of the member organizations to be approved users of the shared computer system from the system manager;

(e) at least one email system operated by each member organization which the employees or members of the member organizations use to receive and send email, where access to email sent to each individual employee or member is securely limited to that individual;

(f) at least one accrediting organization, wherein the at least one accrediting organization registers member organizations and grants rights for employees or members of the member organizations, individuals holding such rights being people who are eligible to use the shared computer system; and (g) a selective list of eligible organizations and individuals;

wherein an organization must be registered by the accrediting organization to be eligible to be a member organization;

wherein a person must be an employee or member of a member organization and hold rights granted by at least one of the accrediting organizations to be eligible to be a user of the shared computer system;

wherein the system manager organizes the shared computer system to enforce registration by an organization and holding of rights by an individual; and wherein the selective list enumerates the individuals who hold such rights and are eligible to become approved users of the shared computer system.

The system can further comprise an invitation computer system distinct from the shared computer system, wherein the invitation computer system is used by a recipient of the email to verify that the recipient holds the proper rights.

BRIEF DESCRIPTION OF THE DRAWINGS

These and other features, aspects, and advantages of the present invention will become better understood with reference to the following description, appended claims, and accompanying drawings where:

FIG. 1 shows a diagram of a system comprising a shared computer system and other components in accordance with the invention. FIG. 1 comprises FIG. 1a and FIG. 1b; FIG. 1b shows the communication between the components shown in FIG. 1a.

FIG. 3 shows four types of computer system user, which are employed herein henceforth. A "non-user" is a person who lacks the necessary rights to use the shared computer system. An "eligible user" is a person who has been granted the rights that are necessary to use the shared computer system, but who has not been provided with account credentials—such as a username and password—to access the shared computer system. A "limited user" is a person who has been granted the rights that are necessary to use the shared computer system, and has been provided with account credentials for accessing the shared computer system, but who cannot perform certain tasks on the shared computer system. Finally, an "authorized user" is a person who has the rights and account credentials of a "limited user", and has full access to the shared computer system. Henceforth, wherever this application employs the term 'user' without any of the four modifiers in this paragraph, it will be understood to mean 'limited user or authorized user', and similarly for the plural term 'users'.

DETAILED DESCRIPTION OF THE INVENTION

Figure 2:
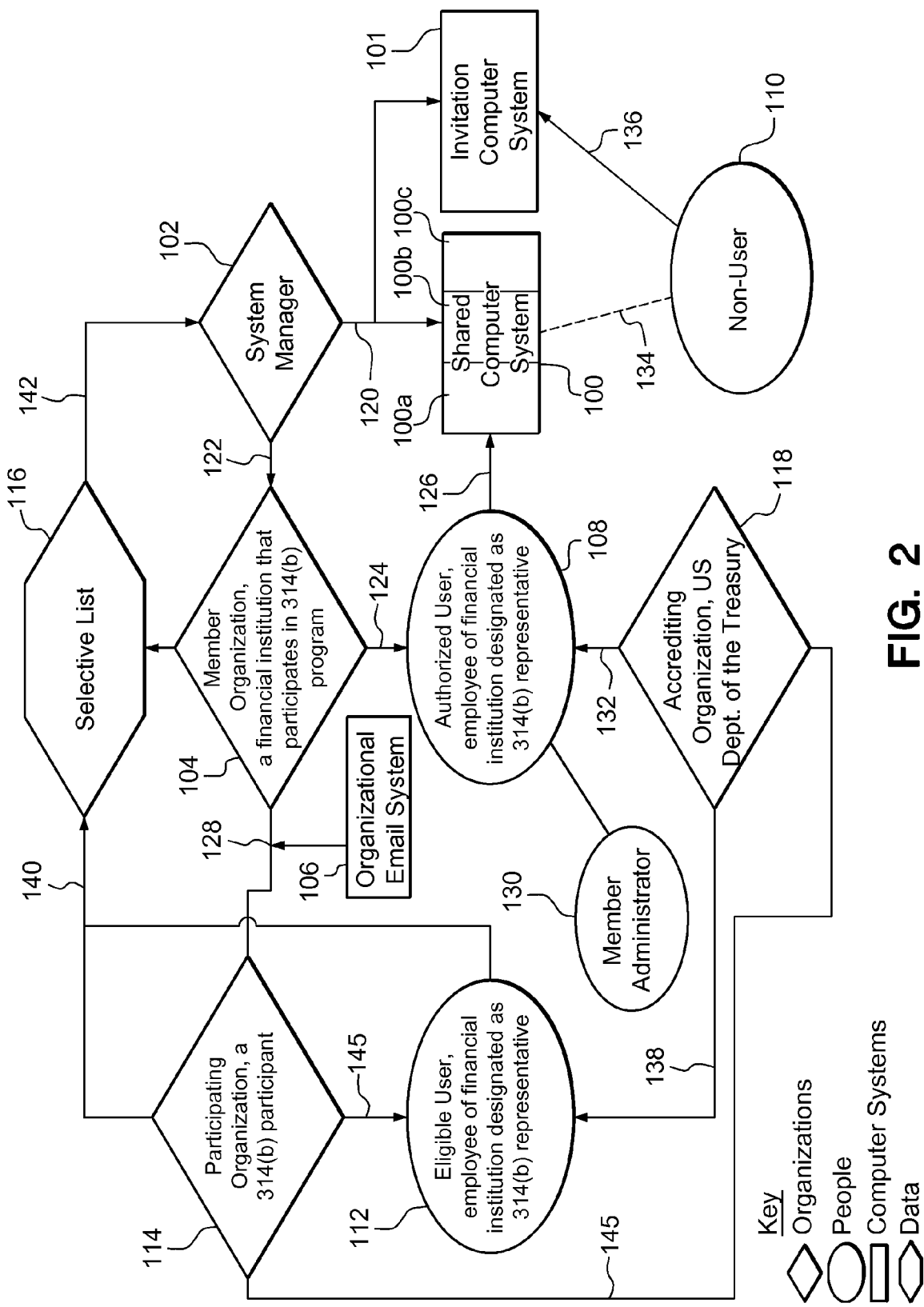
FIG. 2 illustrates a preferred embodiment of the invention.

The detailed description of the invention below includes reference to a preferred embodiment of the invention. An example of the preferred embodiment is illustrated in FIG. 2 of the accompanying drawings. While the invention will be described in conjunction with a preferred embodiment, it will be understood that it is not intended to limit the invention to a single preferred embodiment. To the contrary, it is intended to cover alternatives, modifications, and equivalents as may be included within the spirit and scope of the invention as defined by the appended claims.

The utility of any platform-mediated network typically depends on a large number of users. The details of the accrediting organization and the procedure required for accreditation, including the criteria to be met by the person, will vary with the purpose of the network and the types of information stored and processed within the network. Attracting many people to actively use the shared computer system is a daunting task, particularly where the people must possess some form of accreditation. With the advancement in computing technology making the development of shared computer systems more widespread, a particular need exists for solutions that can quickly resolve the incomplete network problem. Consequently, the invention described herein is well suited for providing secure shared network systems with an efficient means of facilitating growth of their user populations.

Figure 1A:
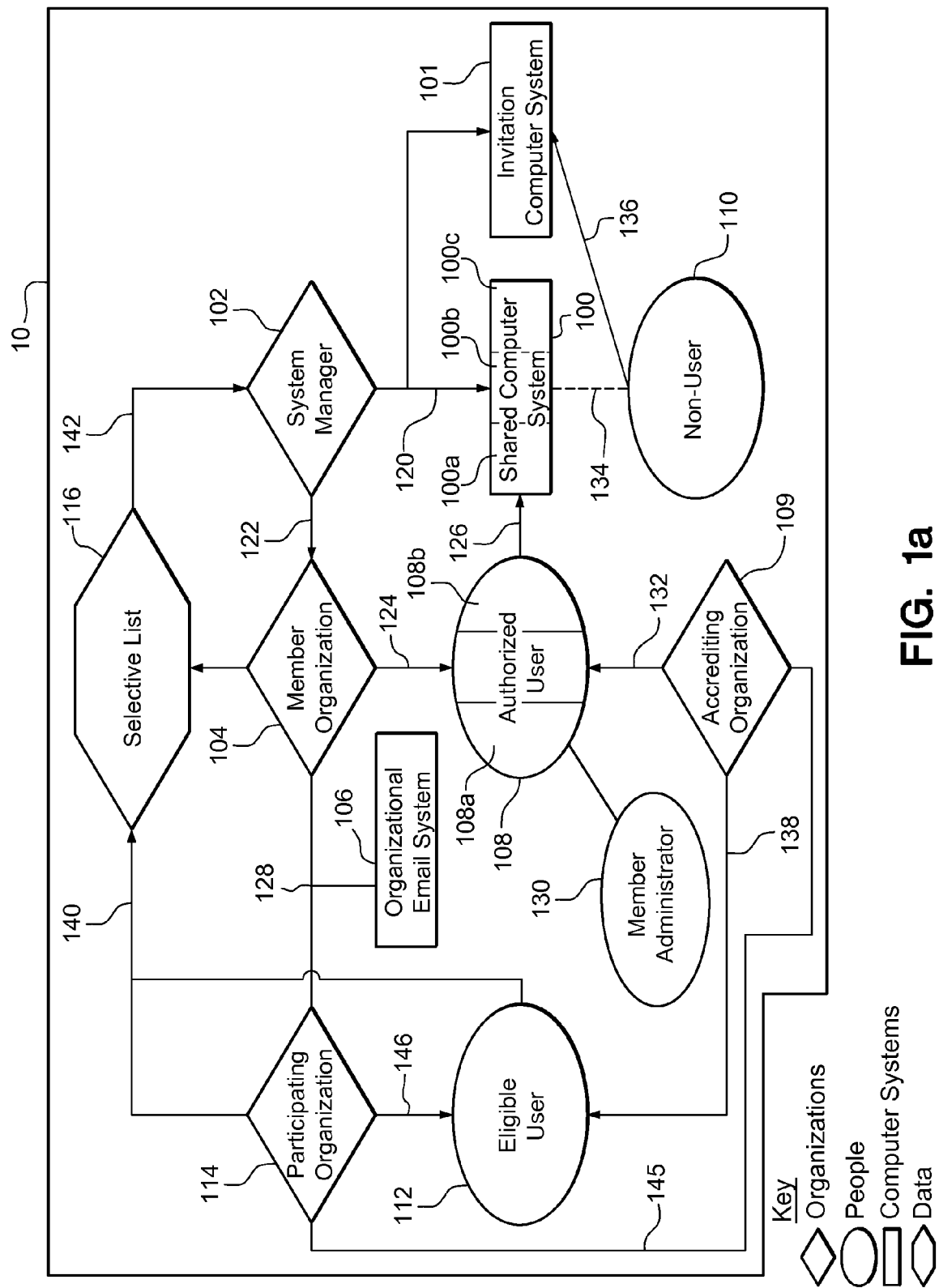
Figure 1B:
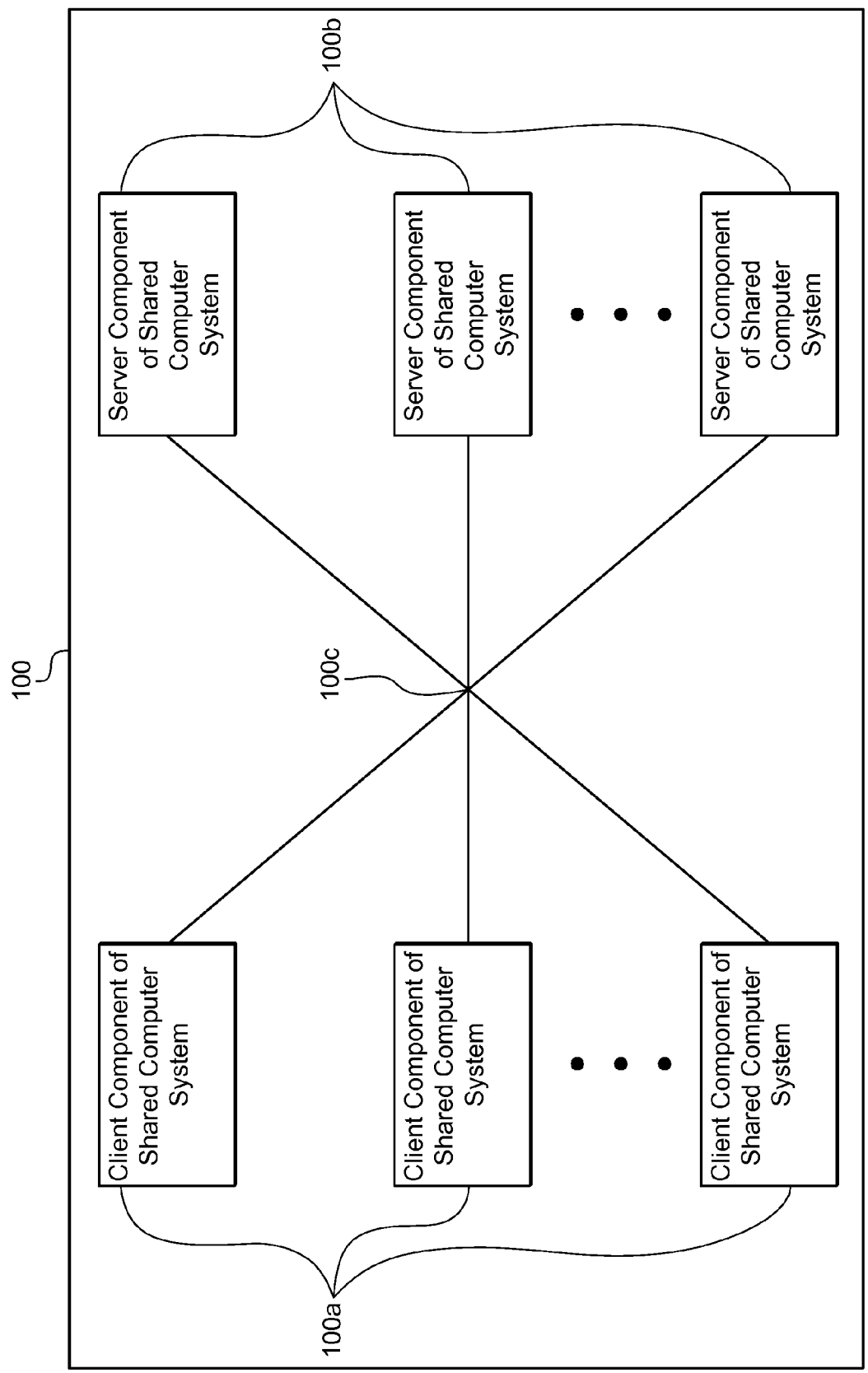

As diagramed in FIG. 1, the system 10 of the invention includes at least the following actors participating in the use and operation of a shared computer system 100 comprising software running on multiple client computers 100a communicating securely over a network with software running on one or more server computers 100b through network connections 100c. The client-server relationship between two or more computers communicating over network connections is well known in the art. The system manager 102 is an organization that controls the operation 120 of shared computer system 100 and auxiliary invitation computer system 101, including client computers 101a communicating securely over a network with software running on one or more server computers 101b through network connections 101c, and has responsibility for maintaining the privacy and security of data stored by shared computer system 100 and for managing access to the shared computer system, including possible delegation of these responsibilities to other organizations, individuals, and systems. Also, the server software in the shared computer system server computers 100b communicates with the server software in the invitation computer system server computers 101b. The system manager 102 provides or otherwise transfers rights 122 to use the shared computer system 100 to member organizations 104. A member organization 104 employs and enrolls users and authorizes them to use 124 the shared computer system 100. An authorized user 108 has full rights 126 to the shared computer system 100. A member organization 104 operates 128 an organizational email system 106 that employees or members of the organization such as authorized users 108 can access but that other people cannot access. Authorized users 108 must possess a particular form of rights issued 132 by an accrediting organization 109. A member administrator 130 is a special type of authorized user 108 who has special rights and responsibilities. A non-user 110 may not access 134 the shared computer system 100 but may access 136 the invitation computer system 101. An eligible user 112 is a person who has also been granted a particular form of rights issued 138 by an accrediting organization 109. Eligible users are a superset of the authorized users 108. Similarly, an accrediting organization 109 may grant an organizational type of the same particular form of rights 145 to participating organizations 114. Participating organizations 114 are a superset of the member organizations 104. Each participating organizations 114 also operates a secure organizational email system. An eligible user 112 may be employed or otherwise specifically associated 146 by a participating organization 114. A participating organization 114 possesses the rights granted by an accrediting organization 109 which are required to become a member organization; similarly, an eligible user 112 has the rights that are required to become an authorized user 108. Typically, eligible users 112 and participating organizations 114 are enumerated with identifying and descriptive attributes in a selective list 116, referred to herein as the selective list. The system manager 102 has access to 142 the selective list 116. FIG. 1b shows the communication between the components shown in FIG. 1a, including the interactions of the computer network.

In a preferred embodiment, illustrated in FIG. 2, the shared computer system 100 comprises software running on one or more secure, access-controlled internet server computers and multiple internet browsers running on client computers that securely communicate with the servers over one or more computer networks. Typically, the internet browsers are commercially available browsers such as Microsoft Internet Explorer, Netscape Navigator, Firefox, Safari, Google Chrome, or other commercially available internet browsers that can support secure communications. The invitation computer system 101 comprises a web server running on a server computer and multiple internet browsers that securely communicate with the server; again, typically the internet browsers are commercially available internet browsers that can support secure communications. Security tools that can be employed include commonly used systems such as firewalls, anti-virus software and denial of service detectors and innovative tools that may not be publicly available. In addition, the servers in the shared computer system 100 communicate securely with the server computers of the invitation computer system 101. The system manager 102 is an entity that operates 120 the shared computer system 100 and invitation computer system 101 and facilitates the exchange and analysis of data otherwise protected by bank secrecy laws and regulations or equivalent laws and regulations that protect financial data or other data deemed sensitive. A member organization 104 is a financial institution or association of financial institutions that obtains the authorization 132 from the United States Department of the Treasury 118 or other accrediting organization to share information with peer institutions about possible fraud, money laundering, or terrorist financing as permitted, in the United States, by the USA Patriot Act Section 314(b), a section of the law that established a voluntary program run by the federal government that allows financial institutions to share information otherwise protected by privacy laws and provides immunity from any civil liability provided the exchange concerns potential fraud, money laundering, or terrorist financing, or, in other countries, by equivalent legislation or regulations permitting the sharing of financial information with peer institutions about possible fraud, money laundering, or terrorist financing. The system manager 102 provides or otherwise transfers rights 122 to use the shared computer system 100 to member organizations 104. Authorized users 108 and eligible users 112 are employees of financial institutions designated as authorized representatives 124 to share information under Section 314(b) of the United States Patriot Act, or, in the case of financial institutions located in or operating in other countries, under equivalent legislation or regulations permitting the sharing of financial information with peer institutions about possible fraud, money laundering, or terrorist financing. The system manager 102 obtains access 142 to a selective list 116 of eligible users 112 and participating organizations 114. The system manager 102 may obtain the selective list 116 through secure file transfer from client computers 100a to server software running on one or more server computers 100b in the shared computer system 100. For example, in a preferred embodiment, a member organization 104 transfers a selective list of all Section 314(b) representatives authorized by the United States Department of the Treasury, whereupon server software on shared computers 100b extracts and loads records identifying and describing eligible users 112 and participating organizations 114 into the shared computer system 100. As such, participating organizations 114 are financial institutions participating in the government-endorsed information-sharing program. An eligible user 112 is a person known by 140 the system manager 102 to have the necessary rights 138 provided by the U.S. Department of the Treasury to access the shared computer system 100, and to be employed by a participating organization 114, in this case a financial institution. An authorized user 108 may access 126 the shared computer system 100. A non-user 110 is a person that cannot access 134 the shared computer system 100 but can access 136 the invitation computer system 101. In addition, each financial institution that is a member organization 104 operates 128 an organizational email system 106, which can only be accessed by its employees. A member administrator 130 is a special type of authorized user 108 who has special rights and responsibilities.

Figure 3:
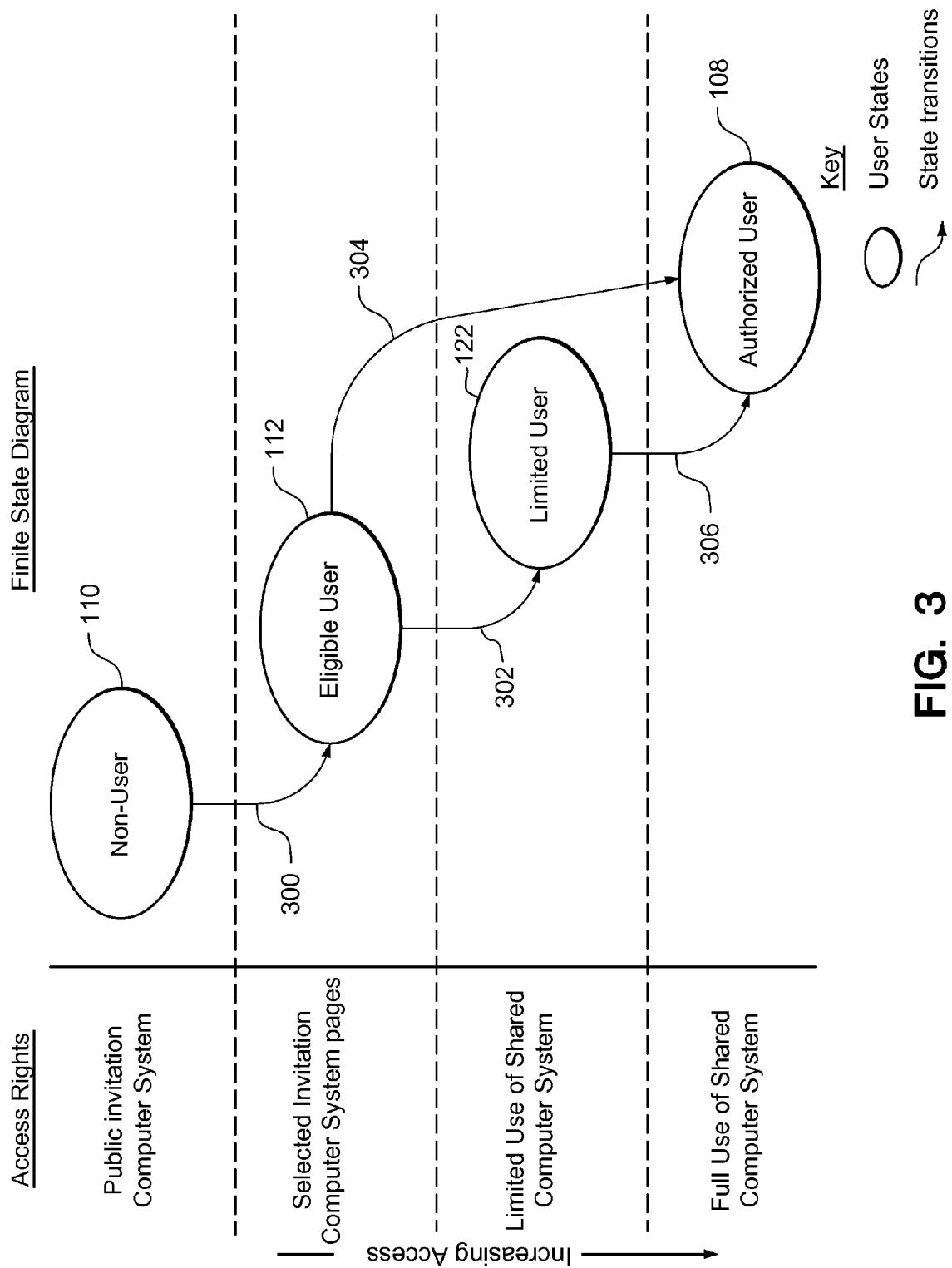
FIG. 3 illustrates the states that a person may occupy with respect to their rights to use a shared computer system in accordance with the invention, and the transitions between these states in accordance with the invention. The diagram of FIG. 3 represents a finite state machine model of a person's status with respect to a particular shared computer system. The ovals represent states of the model, and are labeled inside each oval with the type of user in that state. An arrow represents a transition between states and is labeled with the action or actions that effect the transition. The access rights represented by states increase monotonically down the figure. These rights are listed in the figure's left-hand column.

As diagrammed in FIG. 3, in the invention a non-user 110 may transition into an eligible user 112. Via state transition 300 the identity of the non-user 110 may be added by the accrediting organization 109 to the selective list 116 which contains people with the necessary rights.

Figure 4:
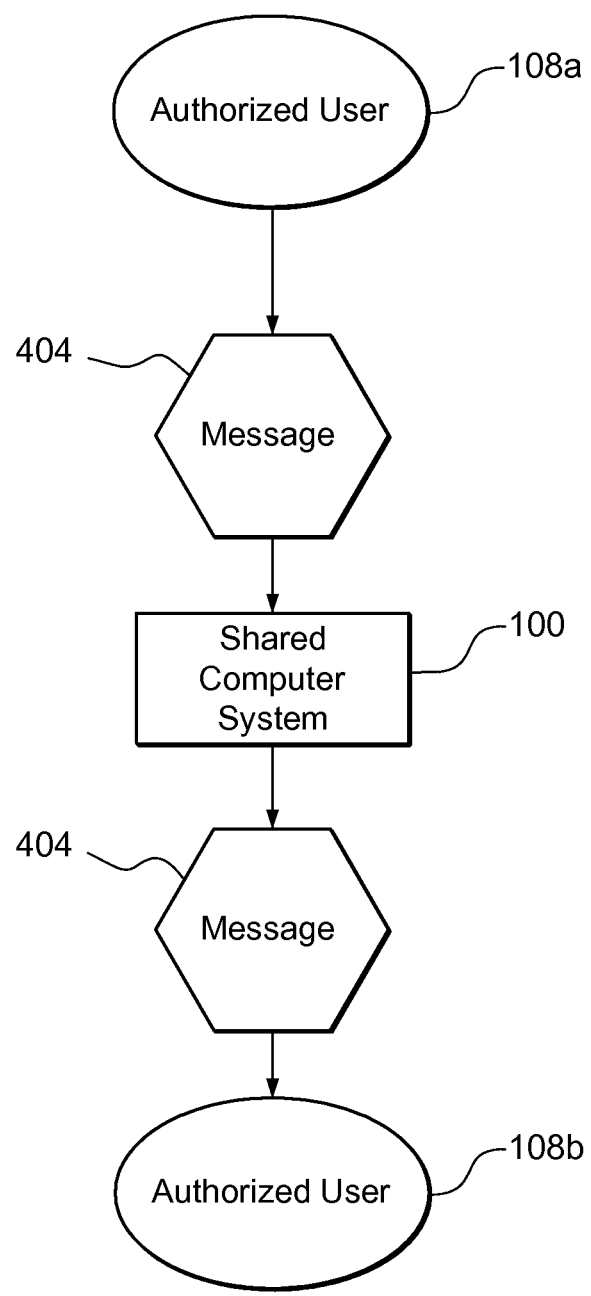
FIG. 4 illustrates one authorized user of a shared computer system sending a message to another authorized user of the shared computer system, in accordance with the invention.

An eligible user 112 may not access the shared computer system 100. However, an eligible user 112 holds the accreditation needed to access the shared computer system 100. As indicated above, the accreditation needed is verified by the system manager 102 and will vary according to the purposes of the shared computer system 100 and the type of information stored and transmitted in the shared computer system 100. Therefore, an eligible user 112 can be listed as a possible recipient of a message 404, which can be any conventional form of digital communication as illustrated in FIG. 4, sent by a user 108. A message 404 sent to an eligible user 112 on the shared computer system 100 will not be accessible to them unless they obtain a higher access level, as illustrated in FIG. 3.

FIG. 3 illustrates two ways in which an eligible user 112 can transition into an authorized user 108 or a limited user 122 who can access the shared computer system 100. Transition 302 illustrates one alternative way in which an eligible user 112 can transition into a limited user 122 who can access the shared computer system 100. In this case, an eligible user 112 who is sent a message 404 by an authorized user 108 receives a private email at their organizational email system 106 indicating that the authorized user 108 has sent them a message 404 on the shared computer system 100. The email contains a request from the authorized user 108 to share information on the shared computer system 100. The body of this email and all other emails discussed in this application only contain information about the authorized user 108 or limited user 122 who wishes to communicate with the eligible user 112; in particular, the email does not contain any of the information contained within the message 404 sent by the authorized user 108 or limited user 122. The shared computer system 100 automatically generates the email and sends it to the eligible user's 112 email address at their organizational email system 106. By receiving the email the eligible user 112 validates their employment with or membership in the eligible user's member organization 104. The eligible user 112 uses information in the email to properly access the invitation computer system 101 to register as a limited user 122.

For example, in the preferred embodiment, a limited user 122 or an authorized user 108 may exchange information about a customer who is possibly engaging in money laundering activity—e.g., a customer who has made suspicious pattern of cash deposits in their bank account followed shortly by an outgoing wire transfer—with a Section 314(b) representative employed at another financial institution, in this case the institution receiving the wire transfer. If the receiving financial institution is a participating organization 114, the invention will enable the limited user 122 or authorized user 108 to send a message 404 to the participating organization's 114 eligible users 112, in this case their Section 314(b) representatives, and request to exchange information with them via the shared computer system 100. Eligible users 112 that receive the email generated by the shared computer system 100 can follow a link in the email to a screen on the invitation site 101, and then follow on-screen instructions provided by the invitation site 101 to convert to a limited user 122, therefore expanding the size of the network and allowing the secure exchange of information between the limited user 122 or authorized user 108 and the new limited user 122.

In another alternative, via transition 304 in the invention, an eligible user 112 can be enrolled as an authorized user 108. Each member organization 104 designates at least one authorized user 108 with special privileges and responsibilities, called a member administrator 130, who oversees the member organization's 104 use of the shared computer system 100. In particular, the member administrator 130 may use the shared computer system 100 to enroll an eligible user 112 as an authorized user 108.

For example, in the preferred embodiment, a member administrator 130 at a financial institution that is a member organization 104 can enroll any of the financial institution's eligible users 112 as an authorized user 108.

In the invention, limited users 122 can access the shared computer system 100. The system manager 102 may, at their discretion, effect one or more restrictions on the privileges of limited users 122 on the shared computer system 100, including limiting the number of limited users 122 employed or otherwise associated with a participating organization 114 or a member organization 104; setting a maximum number of messages 404 a limited user 122 may receive or send; limiting the communications of a limited user 122 to a subset of authorized users 108; or limiting the amount of time a limited user 122 may access the shared computer system 100 before becoming an authorized user 108. By empowering the member administrator 130 to encourage limited users 122 to become authorized users 108, as illustrated by transition 306 in FIG. 3, the invention promotes growth of the network while maintaining the security properties of the shared computer system 100. This is significant because in some embodiments only authorized users 108 can initiate new communications with eligible users 112 and thereby increase the user population.

Figure 5:
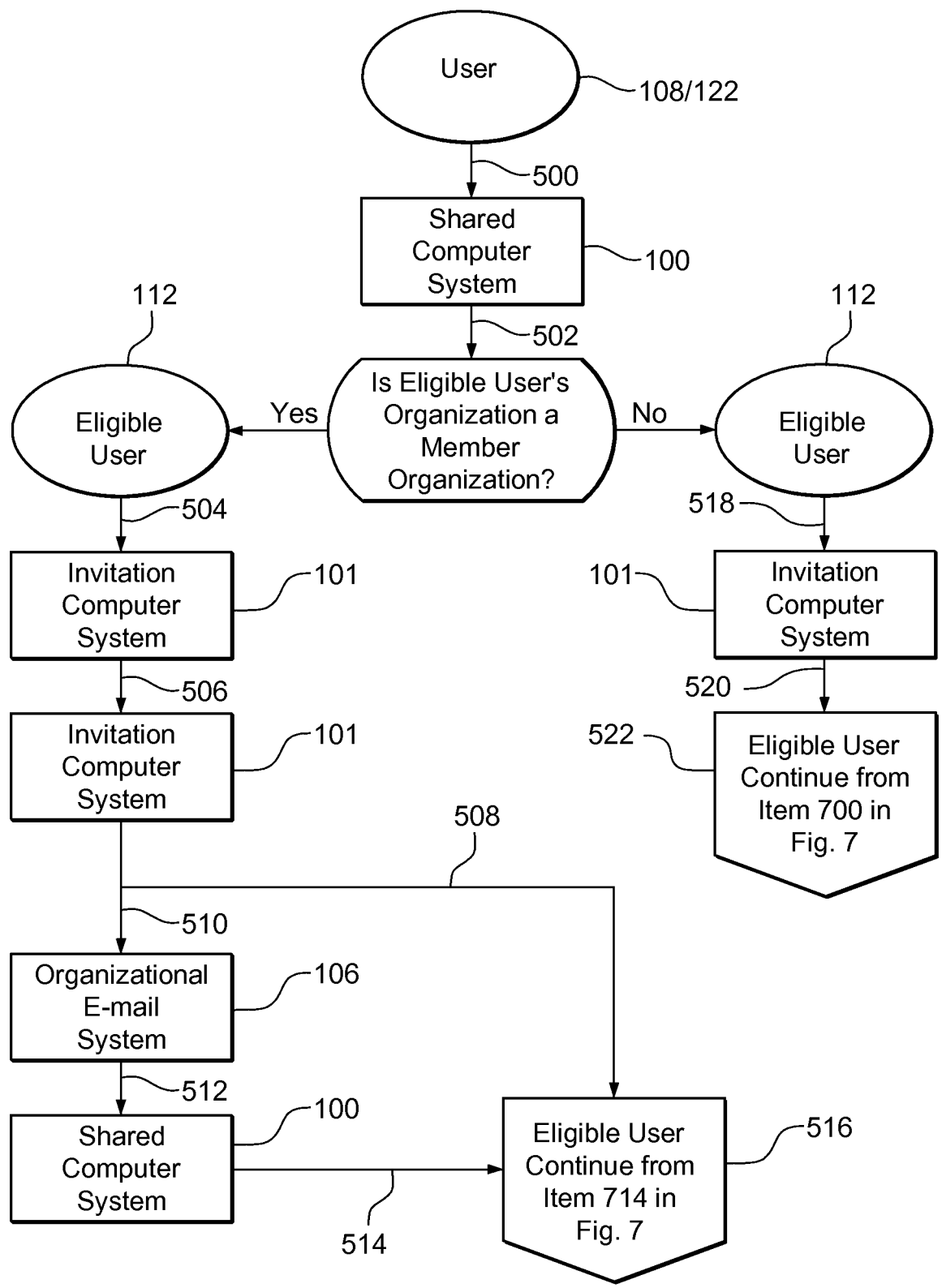
FIG. 5 illustrates the control flow of several paths that originate when an authorized user sends a message to an eligible user on the shared computer system and that communication leads to the registration of the eligible user as a limited user of the shared computer system. The control flow from two elements at the end of the control flow of FIG. 5 continues on and completes in FIG. 7, below.

The invention provides other mechanisms which enable the registration of an eligible user 112 as a limited user 122 or an authorized user 108, as illustrated in FIG. 4 and FIG. 5 and discussed below.

FIG. 4 simply illustrates an example in which one authorized user 108a of the shared computer system 100 sends a message 404 to another authorized user 108b. The message 404 is composed by the sending authorized user 108a in his or her web browser, securely encrypted, and securely transmitted 402a to the shared computer system 100 and securely stored in the shared computer system 100 until the authorized user 108b to whom the message 404 is addressed decides to retrieve it; it is then securely encrypted and securely transmitted 402b to a computer used by the recipient authorized user 108b, where it is decrypted and viewed by that user 108b in his or her web browser. The message 404 sent in FIG. 4 may be retained by the shared computer system 100 indefinitely, and viewed by the sending authorized user 108a in his or her sent message folder or viewed by the receiving authorized user 108b in his or her received or inbox message folder. In general, the sending authorized user 108a may address one message 404 to multiple recipients. The shared computer system 100 makes a copy of the message 404 for each recipient and delivers it according to each recipient's rights to view the message 404.

FIG. 5 diagrams an important use case of the present invention in which the invention rapidly enrolls new members via social networking. In this instance, an authorized user 108 or a limited user 122 sends 500 a message 404 to an eligible user 112. Since a user 108/122 may address a single message 404 on the shared computer system 100 to multiple recipients, the processing of each copy of the message 404 follows its own control flow path as shown in FIG. 5. In what follows, each possible path is described.

Based on the choice of recipient made by user 108/122, the shared computer system 100 sends 502 an email to an eligible user 112 at their organization email address.

If the eligible user's 112 organization is a member organization 104, then the shared computer system 100 automatically generates 504 an email containing a link to the invitation computer system 101. Eligible users 112 that receive the email and follow the link 504 are routed to the invitation computer system 101 whereupon they are asked to input their full name, organizational email address, and, optionally, other credentialing information 506. The invitation computer system 101 captures the data and generates 508 an email to the eligible user 112 at their organization's email system 106 with a link to the invitation computer system 101 whereupon the eligible user 112 follows the "validate and register eligible user as a limited user on shared computer system" process detailed at 714 in FIG. 7. Concurrently with sending 508 the email, the invitation computer system 101 sends 510 an email to the member administrator's 130 organizational email address informing the member administrator 130 that the user 108/122 wants to message the eligible user 112. The email contains a link 512 to the shared computer system 100. If the member administrator 130 follows the link 512 to the shared computer system 100 the member administrator 130 can then use the shared computer system 100 to register the eligible user 112 as a limited user 122, which, in turn, generates an email 514 that informs the eligible user 112 that he or she has been registered as a limited user 122. Again, the eligible user 112 can receive the email in his or her organization's email system and follow a link in the email to the invitation computer system 101 whereupon the eligible user 112 follows the process 516 to register as a limited user 122 as detailed at 714 in FIG. 7.

Returning to the email sent to an eligible user 112, even if the eligible user's 112 organization is not a member organization 104, the invention includes the following process for granting the user limited user status without violating the security properties of the shared computer system 100. The email the eligible user 112 receives 518 contains a link to the invitation computer system 101. By following the link the eligible user 112 can access the invitation computer system 101, where the eligible user 101 inputs 520 his or her name and email address and continues to the process 522 starting at node 700 in FIG. 7 which enables the eligible user 112 to be validated and, possibly, enrolled as a limited user 122.

The utility of the control flow described in FIG. 5 for solving the incomplete network problem can be clearly described via the preferred embodiment. Suppose that an authorized user 108 (an employee of a financial institution designated as a Section 314(b) representative who is responsible for helping the institution combat fraud) has learned that a customer has reported an unauthorized transfer of funds out of their bank account, which the authorized user 108 suspects was a theft. The authorized user 108 may wish to engage in the following operational risk mitigation steps including but not limited to seeking to recover the funds or following the flow of funds to additional financial institutions. The authorized user 108 may engage in these activities for reasons including: limiting fraud related losses, preventing brand damage and customer churn, and complying with federal and state obligations to report suspicious financial activity to the government. Clearly, these mitigation steps would benefit from the authorized user's 108 ability to communicate under USA Patriot Act Section 314(b) over a shared computer system with eligible users 112 at any financial institutions receiving funds connected to this possible theft.

A shared computer system's value to an authorized user increases linearly with each additional authorized user or limited user, because the US Treasury authorizes a fairly constant number of Section 314(b) representatives so the chance that a particular Section 314(b) representative can be messaged on the shared computer system depends simply on the number of authorized users 108 and limited users 122. But the process and methods detailed in FIG. 5 will likely foster exponential growth in the number of authorized users or limited users in the early stages of the system as current authorized users message and bring in their Section 314(b) colleagues, most of whom begin as eligible users. All reproductive systems grow exponentially in this scenario. The rapid growth enabled by this invention will create a real-time messaging system that offers a significant advance in the field of operational risk management through peer-to-peer collaboration.

The invention also facilitates growth of the shared computer system 100 through direct access to the invitation computer system. As diagramed in FIG. 6, this method allows non-users 110 and eligible users 112 interested in gaining access to the shared computer system 100 to independently use the invitation computer system 101 to express their interest in joining the shared computer system 100 and, when possible, validate their eligibility and obtain limited user 122 status. The process begins in all instances with the non-user 110 or eligible user 112 selecting 600 their organization from the selective list 116. In one embodiment, the selective list 116 of participating organizations 114 is prepared by the system manager 102 based on their access to multiple selective lists 116 provided by member organizations 104. Depending on the selection, and the relationship between the organization and the system manager 102, one of three separate processes may occur.

First, if the non-user 110 or eligible user 112 is associated with an organization that is a member organization 104 of the shared computer system 100, then the non-user 110 or eligible user 112 is asked to input 602 his or her accreditation status. Depending on the answer 604 of the non-user 110 or eligible user 112, differing process flows ensue. If the user claims to be properly accredited, the user is requested to input 606 his or her identifying information and is routed to the verification process detailed starting at node 700 in FIG. 7. If the user does not claim to be accredited 608, the user is asked 608 for his or her name and email address, which is inputted into the invitation computer system 101 triggering 610 an email to the non-user 110 or eligible user 112 acknowledging their interest, which is sent to the organizational email system 106.

Alternatively, if the organization that the non-user 110 or eligible user 112 selects 600 is not a member organization 104 but is a participating organization 114, then the non-user 110 or eligible user 112 is similarly asked to input 612 his or her accreditation status. If the user claims to be properly accredited, after inputting 616 his or her identifying information the user is transferred to the verification process outlined at 700 in FIG. 7. As such, a non-user 110 or eligible user 112 may ultimately join the shared computer system 100 through an automated process thereby alleviating the incomplete network problem. If the organization selected in 600 is not listed 618 in the selective list 116 then the non-user 110 or eligible user 112 is requested to input 620 the name of the organization and other identifying information and also input 622 his or her name and email address. An email is then sent 624 to the non-user 110 or eligible user 112 acknowledging his or her interest; the email is sent to the user's email system 626.

Figure 6:
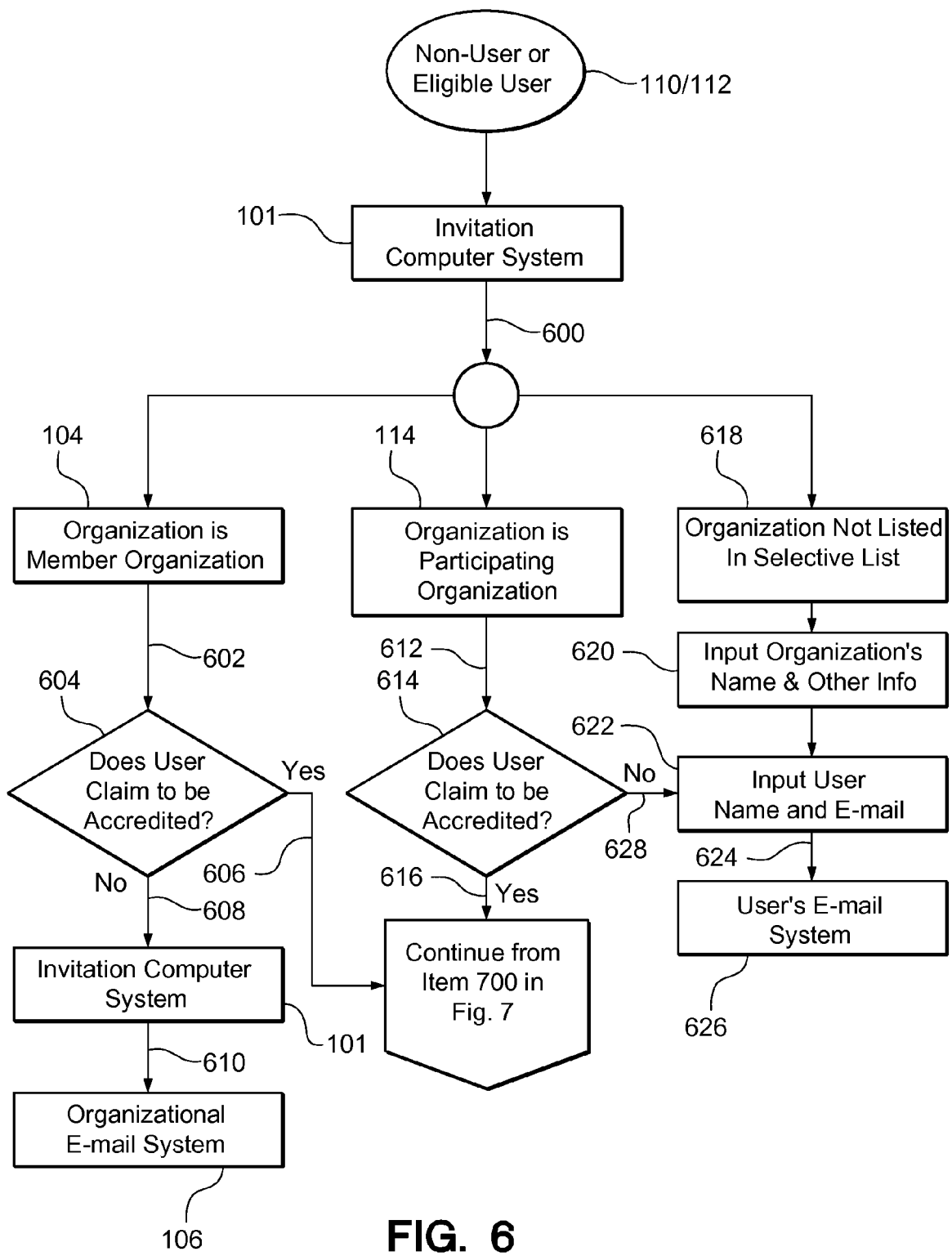
FIG. 6 illustrates the control flow of several paths that begin when a non-user or an eligible user registers as a limited user by using the invitation computer system, as discussed below. The control flow from one element at the end of the control flow of FIG. 6 continues on and completes in FIG. 7, below.
Figure 7:
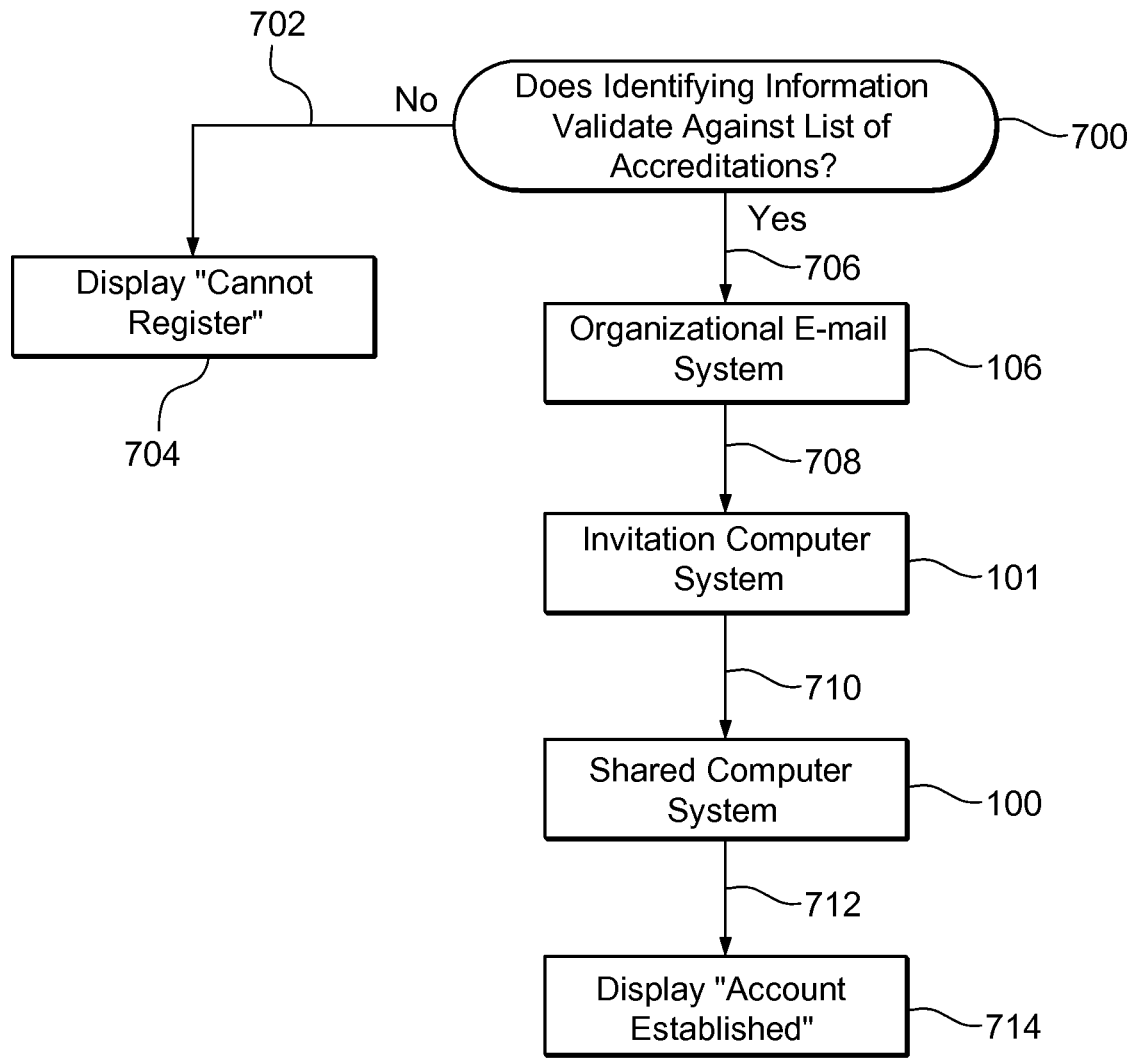
FIG. 7 illustrates the control flow that validates and registers an eligible user as a limited user on the shared computer system. These are the final steps of the control flow that originates in FIG. 5 or FIG. 6.

FIG. 7 integrates with FIGS. 5 and 6 and details the completion of the invention's process for validating and registering eligible users 112 as limited users 122 on the shared computer system 100. Overall, when an eligible user 112 or non-user 110 is asked to input information (see FIG. 6), the invention validates those inputs against reliable data contained in the selective list 116. If the data input does not match an entry in the selective list 116, then the eligible user 112 or non-user 110 is sent 702 an email denying registration rights, and the invitation computer system 101 displays a response indicating that the user cannot register. If there is a proper match, an email confirming the match is sent 706 to the organizational email system 106 of the eligible user 112. The email contains a link to the invitation computer system 101. Upon receipt of the email the eligible user 112 clicks 708 on a link that the email contains, which routes the user to the invitation computer system 101. The user then verifies 710 additional information and follows a link from the invitation computer system 101 to the shared computer system 100 and sets up 712 an account on the shared computer system 100, which reports 714 the creation of the account to the user. This process transitions the eligible user 112 into a limited user 122 or an authorized user 108 as illustrated in transitions 302 and 304 respectively in FIG. 3.

As shown in FIGS. 5, 6, and 7, key features of the invention are derived from the system manager's 102 access to the selective list 116. The selective list 116 may contain both credential and contact information about eligible users 112 and participating organizations 114, which, when coupled with the verification methods, distinguishes the invention relative to the growth process of other social networks that are highly reliant upon existing users providing this type of information. We call these platforms user dependent networks. For example, some user dependent networks can only achieve growth through existing users providing email addresses of their contacts and/or inviting others to join. The invention on the other hand is able to achieve rapid growth through its core use case, messaging, without depending on existing users providing their contact data to the system manager. Likewise, potential access to the shared computer system, which requires proper accreditation, remains open to all eligible users through the invitation system and validation process without compromising the security of the shared computer system.

Figure 8:
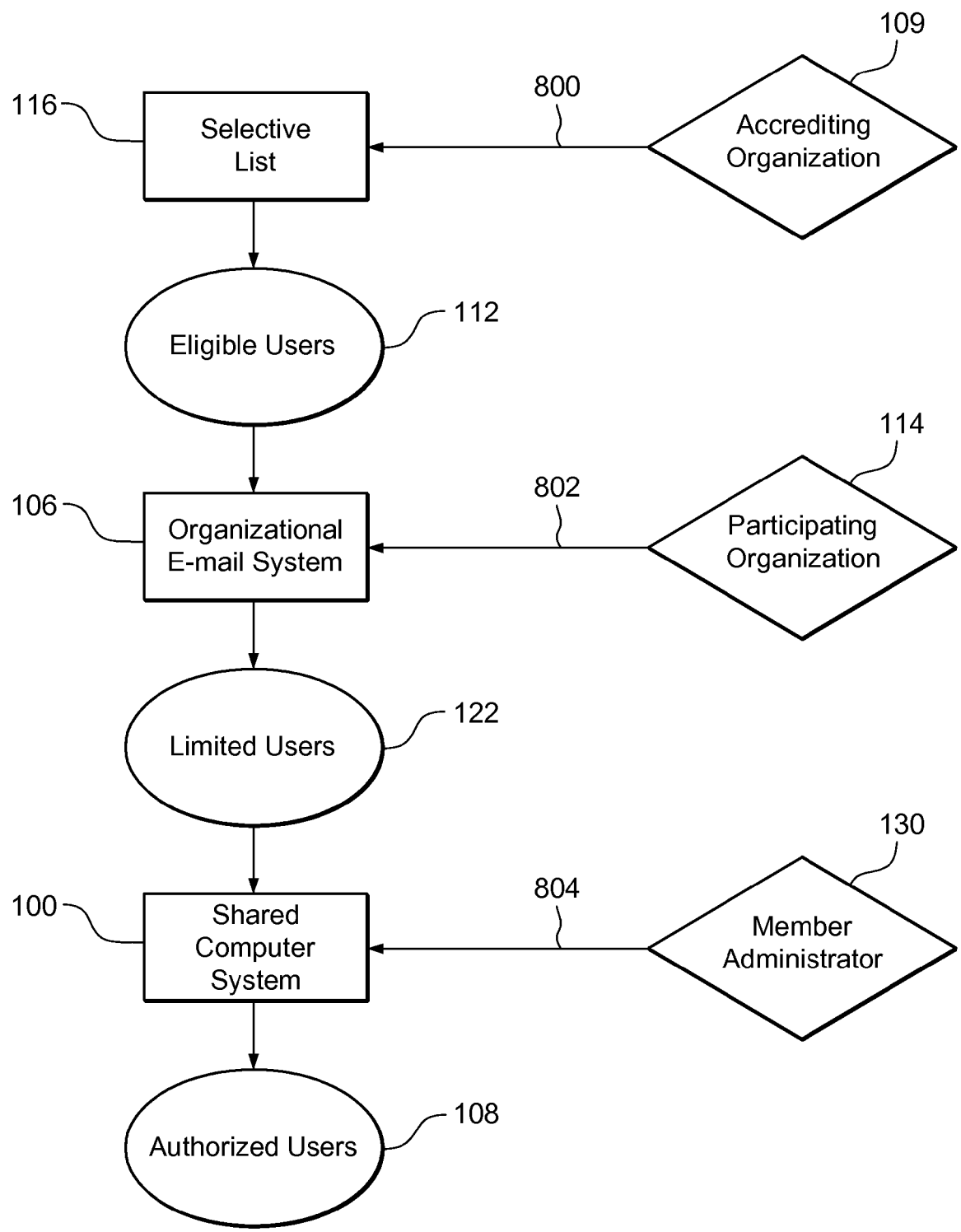
FIG. 8 illustrates the security levels of the shared computer system coordinated with mechanisms for growing the eligible user, limited user and authorized user populations of the shared computer system through a social network, including restriction to eligible users listed in the selective list, restrictions on sending emails inviting eligible users to join, and limiting invitations to join to valid member administrators.

As illustrated in FIG. 8, the invention combines high security for the shared computer system with growth through the social network among authorized users 108 and eligible users 112 listed in the selective list 116. Starting at the top of FIG. 8, the first layer of security restricts 800 eligible users 112 to the people listed in the selective list 116 which is managed by a responsible accrediting organization 118, such as, for example, the US Treasury in the preferred embodiment. The second layer of security in the invention is that registering an eligible user 112 as a limited user 122 requires that the eligible user be able to access their organizational email system 106. Since the responsible accrediting organization 118 that manages the selective list 116 only includes participating organizations 114 with secure email systems 802 in the selective list 116, only valid eligible users 112 will be able to receive the emails sent in 610 and 624. Finally, only valid member administrators 130 with access 804 to the shared computer system 100 will be able to receive the emails sent in 505, and be able to advance the enrollment of a limited user 122 to an authorized user 108.

Accordingly, one aspect of the present invention is a system and method for rapid enrollment of users of a secure shared computer network comprising:

(a) a secure shared computer system accessible only by approved users;

(b) a plurality of approved users of the secure shared computer system;

(c) a system manager that operates the secure shared computer system;

(d) a plurality of member organizations, wherein the member organizations purchase a right to allow employees or members of the member organizations to be approved users of the shared computer system from the system manager;

(e) at least one email system operated by each member organization which the employees or members of the member organizations use to receive and send email, where access to email sent to each individual employee or member is securely limited to that individual;

(f) at least one accrediting organization, wherein the at least one accrediting organization registers member organizations and grants rights for employees or members of the member organizations, individuals holding such rights being people who are eligible to use the shared computer system; and (g) a selective list of eligible organizations and individuals;

wherein an organization must be registered by the accrediting organization to be eligible to be a member organization;

wherein a person must be an employee or member of a member organization and hold rights granted by at least one of the accrediting organizations to be eligible to be a user of the shared computer system;

wherein the system manager organizes the shared computer system to enforce registration by an organization and holding of rights by an individual; and wherein the selective list enumerates the individuals who hold such rights and are eligible to become approved users of the shared computer system.

In yet another alternative, the system possesses one or more security properties to restrict access or use by individuals who are not approved users.

In still another alternative, the system allows limited users to use the system, wherein the system imposes at least one restriction on the rights of a limited user.

In yet another alternative, the restriction on the rights of a limited user are selected from the group consisting of: (i) limiting the number of limited users employed or otherwise associated with an organization; (ii) setting a maximum number of messages a limited user can receive or send; (iii) limiting the communications of a limited user to a subset of approved users; and (iv) limiting the time a limited user may access the shared computer system before becoming an approved user.

In still another alternative, when the system possesses one or more security properties to restrict access or use by individuals who are not approved users, the list of individuals who are members or employees of a member organization further includes the email address of each individual that is a member or an employee of a member organization so that, if a user of the shared computer system wishes to interact with a person who is on the list of individuals who are members or employees of a member organization but is not an approved user, the shared computer system can, without violating security properties of the shared computer system, send an email to an individual who is a member or an employee of a member organization indicating the approved user wishes to communicate with the individual via the shared computer system, and the individual can securely receive the email by using an email system that is securely operated by the member organization. In this alternative, the system can further comprise an invitation computer system distinct from the shared computer system, wherein the invitation computer system is used by a recipient of the email to verify that the recipient holds the proper rights.

In still another alternative, when the system possesses one or more security properties to restrict access or use by individuals who are not approved users, a selective list of the individuals who hold rights granted by one of the accrediting organizations further includes the email address of each individual who holds such rights so that, if a user of the shared computer system wishes to interact with a person who is listed on the selective list of the individuals who hold rights granted by one of the accrediting organizations but is not an approved user, the shared computer system can, without violating security properties of the shared computer system, send an email to an individual who hold rights granted by one of the accrediting organizations indicating that the user wishes to interact with the individual, and the individual can securely receive the email by using an email system that is securely operated by a participating organization that has been accredited by an accrediting organization. In this alternative, the system can further comprise an invitation computer system distinct from the shared computer system, wherein the invitation computer system is used by a recipient of the email to verify that the recipient holds the proper rights and is employed by or a member of the participating organization.

In still another alternative, the accrediting organization is the United States Department of the Treasury and wherein member organizations are financial institutions that participate in fraud detection and mitigation activities permitted by Section 314(b) of the USA Patriot Act, wherein a financial institution must be registered with the United States Department of the Department under Section 314(b) to be eligible to be a member organization, wherein a person must be an employee or member of a registered financial organization and registered as an agent under Section 314(b) to be eligible to be an approved user, and wherein the system manager configures the shared computer system to enforce these eligibility requirements. In this alternative, the system may further comprise a feature that enables an approved user to provide a copy of the selective list of 314(b) agents and participating financial institutions to the system manager over a secure computer network.

In still another alternative, the accrediting organization is a department of the government of a country other than the United States of America and member organizations are financial institutions that participate in fraud detection and mitigation activities permitted by one or more laws in said country.

In still another alternative, the shared computer system comprises software running on multiple client computers communicating securely over a network with software running on one or more server computers. In one version of this alternative, the shared computer system can also comprise software running on one or more secure, access-controlled internet server computers and multiple internet browsers running on client computers that securely communicate with the servers over one or more computer networks. The invitation computer system can also comprise software running on multiple client computers communicating securely over a network with software running on one or more server computers.

In yet another alternative, when the system comprises the invitation computer system, a non-user of the shared computer system can access the invitation system, register to indicate that the non-user has been granted rights by the accrediting organization, and be validated as having those rights.

In still another alternative, registering an eligible user as a limited user requires that the eligible user receive an email at an email system secure operated by the eligible user's participating organization, wherein the email contains a link including a non-forgeable access code which the eligible user may use to further the process of verifying their credentials to the shared computer system.

Advantages of the Invention

The present invention provides a solution to the incomplete network problem for a shared computer system while retaining security safeguards. The present invention does not require specialized hardware and can run on any network with any conventionally available operating system.

All networks with fragmented user bases face the prospect that adoption may stall because they cannot be assured that others will want to join the network. See Eisenmann, T. "Platform Mediated Networks: Definitions and Core Concepts," Harvard Business School Module Note, October 2007.

Specifically, within the incomplete network problem the invention ameliorates what economists call the "penguin problem," in which "[h]ungry penguins gather at the edge of an iceberg, reluctant to dive into the water. There is food in the water, but a killer whale might be lurking, so no penguin wants to dive first. In such circumstances, individual rationality may lead a group to forfeit attractive opportunities, for example, a predator-free meal or an innovative new networked product." (T. Eisenmann (2007), supra).

The invention's key characteristics, namely, a selective group of eligible and approved users and validating security methods, mitigate the "penguin problem" by creating a social environment in which each person feels an affinity for the other people in the environment which leads each individual to perceive a lower risk for participating and a greater likelihood that others will participate. Altering the distribution of individual perceptions in this way demonstrably increases the likelihood that new users will join the network.

The benefits of the invention are magnified when the network is used to increase information sharing as contemplated in the preferred embodiment. The value of shared data is well known particularly in the financial industry: "The importance of information-sharing in the modern American economy cannot be overstated. The rapid and reliable availability of accurate and complete personal information is essential to—it is no exaggeration to say that it is the very foundation of—virtually all financial services." Cate, F. "Personal Information In Financial Services: The Value Of A Balanced Flow," Financial Services Coordinating Council, 2000 available at http://www.aba.com/aba/PDF/cate.pdf.

Financial frauds and money laundering pose considerable threats to consumers, businesses, economies, and the stability and integrity of financial systems and sharing of information is one of the best ways to curtail losses (T. Eisenmann (2007), supra)

Annually, trillions of dollars tied to illicit activity flows through the global financial system, approximately 3-4% of global GDP. Baker, W. and Joly, E. "Illicit Money: Can it be Stopped," New York Review of Books, Dec. 3, 2009. Of this amount, it is estimated that yearly tens of billions of dollars can be attributed to fraudulent activity resulting in losses to financial institutions and customers. Basel Committee On Banking Supervision "Results from the 2008 loss data collection exercise for operational risk," (2009).

Against this backdrop, financial institutions face not only exposure to actual fraud. Financial institutions may encounter significant regulatory and criminal fines and sanctions for not adequately detecting and reporting suspicious activity. As a result, they may suffer damage to their reputation and see business opportunities curtailed. Moreover, billions of dollars must be spent annually on fraud detection, sanctions compliance, counter terrorist financing, and anti-money laundering operations and technology.

Commonly, financial institutions rely on surveillance and screening software to detect questionable activity requiring investigation. While this method is somewhat effective, when financial institutions may have questions about a particular transaction triggering the investigation, greater inter-industry connectivity and data sharing through in a secure network environment allows for faster and more effective issue resolution. In addition, network connectivity enables large-scale pattern recognition, analytics, and the aggregation of information about illicit actors and typologies across the industry and sectors. The Invention is a significant step toward making these capabilities not only more routine and efficient but safe for both industry and consumers.

Networks contemplated according to the Invention's methods and designs enjoy significant advantages derived from the combination of factors including: ability to initiate with a small user base, affordance of security to potential new users, and non-essential requirement that users of the network be responsible for its creation and management.

Unmistakably, the invention as described in the preferred embodiment possesses industrial applicability and application of the connectivity schema is an advance capable of solving communication and information-sharing gaps in highly regulated and privacy protected arenas such as financial services. Other arenas such as health care, national security, law enforcement, and education are also highly regulated and privacy protected and would benefit from this Invention.

The present invention possesses industrial applicability as a computer-based system.

The method claims of the present invention provide specific method steps that are more than general applications of laws of nature and require that those practicing the method steps employ steps other than those conventionally known in the art, in addition to the specific applications of laws of nature recited or implied in the claims, and thus confine the scope of the claims to the specific applications recited therein.

The inventions illustratively described herein can suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the future shown and described or any portion thereof, and it is recognized that various modifications are possible within the scope of the invention claimed. Thus, it should be understood that although the present invention has been specifically disclosed by preferred embodiments and optional features, modification and variation of the inventions herein disclosed can be resorted by those skilled in the art, and that such modifications and variations are considered to be within the scope of the inventions disclosed herein. The inventions have been described broadly and generically herein. Each of the narrower species and subgeneric groupings falling within the scope of the generic disclosure also form part of these inventions. This includes the generic description of each invention with a proviso or negative limitation removing any subject matter from the genus, regardless of whether or not the excised materials specifically resided therein.

It is also to be understood that the above description is intended to be illustrative and not restrictive. Many embodiments will be apparent to those schooled in the art upon reviewing the above description. The scope of the invention should therefore, be determined not with reference to the above description, but should instead be determined with reference to the appended claims, along with the full scope of equivalents to which such claims are entitled. The disclosures of all articles and references, including patent publications, are incorporated herein by reference.

What is claimed is:

1. A system for rapid enrollment of users of a secure, shared computer system comprising:

(a) a secure shared computer system accessible only by approved users;
    (b) a plurality of approved users of the secure shared computer system;
    (c) a system manager that operates the secure shared computer system;
    (d) a plurality of member organizations, wherein the member organizations purchase a right to allow employees or members of the member organizations to be approved users of the shared computer system from the system manager;
    (e) at least one email system operated by each member organization which the employees or members of the member organizations use to receive and send email, where access to email sent to each individual employee or member is securely limited to that individual;
    (f) at least one accrediting organization, wherein the at least one accrediting organization registers member organizations and grants rights for employees or members of the member organizations, individuals holding such rights being people who are eligible to use the shared computer system; and
    (g) a selective list of eligible organizations and individuals,
    wherein an organization must be registered by the accrediting organization to be eligible to be a member organization;
    wherein a person must be an employee or member of a member organization and hold rights granted by at least one of the accrediting organizations to be eligible to be a user of the shared computer system,
    wherein the system manager organizes the shared computer system to enforce registration by an organization and holding of rights by an individual,
    wherein the selective list enumerates the individuals who hold such rights and are eligible to become approved users of the shared computer system,
    wherein the accrediting organization is the United States Department of the Treasury and member organizations are financial institutions that participate in fraud detection and mitigation activities permitted by Section 314(b) of the USA Patriot Act,
    wherein the financial institutions are registered with the United States Department of the Treasury under Section 314(b) to be eligible to be a member organization,
    wherein a person must be an employee or member of a registered financial organization and registered as an agent under Section 314(b) to be eligible to be an eligible user,
    wherein the system manager configures the shared computer system to enforce these eligibility requirements.

2. The system of claim 1 wherein the system possesses one or more security properties to restrict access or use by individuals who are not approved users.

3. The system of claim 1 wherein the system allows limited users to use the system, wherein the system imposes at least one restriction on the rights of a limited user.

4. The system of claim 3 wherein the restriction on the rights of a limited user are selected from the group consisting of: (i) limiting the number of limited users employed or otherwise associated with an organization; (ii) setting a maximum number of messages a limited user can receive or send; (iii) limiting the communications of a limited user to a subset of authorized users; and (iv) limiting the time a limited user may access the shared computer system before becoming an authorized user.

5. The system of claim 1 wherein the list of individuals that are members or employees of a member organization further includes the email address of each individual that is a member or an employee of a member organization so that, if a user of the shared computer system wishes to interact with a person who is on the list of individuals that are members or employees of a member organization but is not an approved user, the shared computer system can, without violating security properties of the shared computer system, send an email to an individual that is a member or an employee of a member organization indicating the approved user wishes to communicate with the individual via the shared computer system, and the individual can securely receive the email by using an email system that is securely operated by the member organization.

6. The system of claim 5 further comprising an invitation computer system distinct from the shared computer system, wherein the invitation computer system is used by a recipient of the email to verify that the recipient holds the proper rights granted by an accrediting organization.

7. The system of claim 1 wherein potential users can inquire about becoming approved users through social networking.

8. The system of claim 1, further comprising an invitation computer system distinct from the shared computer system, wherein the invitation computer can verify that an individual holds the proper rights granted by an accrediting organization, and then send the individual an email that the individual will receive at the email system that is securely operated by the member organization with which the individual is associated.

9. The system of claim 1 wherein the shared computer system comprises software running on multiple client computers communicating securely over a computer network with software running on one or more server computers.

10. The system of claim 6 wherein the invitational computer system comprises software running on multiple client computers communicating securely over a computer network with software running on one or more server computers.

11. The system of claim 1 wherein the shared computer system comprises network server software running on one or more secure, access-controlled internet server computers and multiple internet browsers running on client computers that securely communicate with the server computers over one or more computer networks.

12. The system of claim 6 wherein the shared computer system comprises network server software running on one or more secure, access-controlled internet server computers and multiple internet browsers running on client computers that securely communicate with the server computers over one or more computer networks.

13. The system of claim 1 wherein a non-user of the shared computer system can be loaded into the shared computer system by the system manager from an entry in the selective list.

14. The system of claim 6 wherein a non-user of the shared computer system can access the invitation system, register to indicate that the non-user has necessary rights, and be validated as having those credentials.

15. The system of claim 1 wherein registering an eligible user as a limited user requires that the eligible user receive an email at the eligible user's email system with a link including a non-forgeable access code.

16. A system for rapid enrollment of users of a secure, shared computer system comprising:

(a) a secure shared computer system accessible only by approved users;
(b) a plurality of approved users of the secure shared computer system;
(c) a system manager that operates the secure shared computer system;
(d) a plurality of member organizations, wherein the member organizations purchase a right to allow employees or members of the member organizations to be approved users of the shared computer system from the system manager;
(e) at least one email system operated by each member organization which the employees or members of the member organizations use to receive and send email, where access to email sent to each individual employee or member is securely limited to that individual;
(f) at least one accrediting organization, wherein the at least one accrediting organization registers member organizations and grants rights for employees or members of the member organizations, individuals holding such rights being people who are eligible to use the shared computer system; and
(g) a selective list of eligible organizations and individuals, wherein an organization must be registered by the accrediting organization to be eligible to be a member organization, wherein a person must be an employee or member of a member organization and hold rights granted by at least one of the accrediting organizations to be eligible to be a user of the shared computer system, wherein the system manager organizes the shared computer system to enforce registration by an organization and holding of rights by an individual, wherein the selective list enumerates the individuals who hold such rights and are eligible to become approved users of the shared computer system, wherein the accrediting organization is a department of the government of a country other than the United States of America and member organizations are financial institutions that participate in fraud detection and mitigation activities permitted by one or more laws in said country.

17. The system of claim 16 wherein the system possesses one or more security properties to restrict access or use by individuals who are not approved users.

18. The system of claim 16 wherein the system allows limited users to use the system, wherein the system imposes at least one restriction on the rights of a limited user.

19. The system of claim 18 wherein the restriction on the rights of a limited user are selected from the group consisting of: (i) limiting the number of limited users employed or otherwise associated with an organization; (ii) setting a maximum number of messages a limited user can receive or send; (iii) limiting the communications of a limited user to a subset of authorized users; and (iv) limiting the time a limited user may access the shared computer system before becoming an authorized user.

20. The system of claim 16 wherein the list of individuals that are members or employees of a member organization further includes the email address of each individual that is a member or an employee of a member organization so that, if a user of the shared computer system wishes to interact with a person who is on the list of individuals that are members or employees of a member organization but is not an approved user, the shared computer system can, without violating security properties of the shared computer system, send an email to an individual that is a member or an employee of a member organization indicating the approved user wishes to communicate with the individual via the shared computer system, and the individual can securely receive the email by using an email system that is securely operated by the member organization.

\* \* \* \* \*